United States Patent
Shinde et al.

(10) Patent No.: US 11,548,644 B2
(45) Date of Patent: Jan. 10, 2023

(54) EASY HOOK ARMREST ASSEMBLY FOR AIRCRAFT SEAT

(71) Applicant: GOODRICH CORPORATION, Charlotte, NC (US)

(72) Inventors: Rajesh A Shinde, Peshtigo, WA (US); Rob Jacobson, Marinette, WI (US); Kyle David Doughty, Colorado Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/071,775

(22) Filed: Oct. 15, 2020

(65) Prior Publication Data

US 2021/0024218 A1  Jan. 28, 2021

Related U.S. Application Data

(62) Division of application No. 16/278,521, filed on Feb. 18, 2019, now Pat. No. 10,829,224.

(51) Int. Cl.
   *B60N 2/75* (2018.01)
   *B64D 11/06* (2006.01)
(52) U.S. Cl.
   CPC .......... *B64D 11/0646* (2014.12); *B60N 2/787* (2018.02)
(58) Field of Classification Search
   CPC .. B64D 11/0644; B64D 11/0646; B60N 2/787
   See application file for complete search history.

(56) References Cited

U.S. PATENT DOCUMENTS

| | | | |
|---|---|---|---|
| 2,650,656 A * | 9/1953 | Ohlsson | A47C 4/028 297/440.23 |
| 4,027,916 A | 6/1977 | McElroy | |
| 4,099,780 A | 7/1978 | Schmidhuber | |
| 5,658,049 A | 8/1997 | Adams et al. | |
| 5,931,535 A | 8/1999 | Sweet | |
| 7,480,947 B2 | 1/2009 | Patella | |
| 8,356,954 B2 * | 1/2013 | Koch | A47C 17/02 403/353 |
| 8,376,462 B2 * | 2/2013 | Marini | B64D 11/06 297/344.24 |
| 9,616,785 B2 * | 4/2017 | Marini | B60N 2/77 |
| 9,758,250 B2 | 9/2017 | Meister et al. | |
| 10,829,224 B2 * | 11/2020 | Shinde | B60N 2/787 |
| 2004/0021349 A1 | 2/2004 | Longtin et al. | |

(Continued)

FOREIGN PATENT DOCUMENTS

WO   2008134841   11/2008

OTHER PUBLICATIONS

European Patent Office, European Search Report dated Jul. 15, 2020 in Application No. 19215835.0.

(Continued)

*Primary Examiner* — Philip F Gabler
(74) *Attorney, Agent, or Firm* — Snell & Wilmer L.L.P.

(57) ABSTRACT

An armrest for a seat may comprise paneling and an easy hook assembly. The easy hook assembly may include a flange and a keyhole protrusion. The flange and the keyhole protrusion may each extending beyond an exterior surface of the paneling. The flange and the keyhole protrusion may allow the armrest to be installed after the paneling is attached.

9 Claims, 4 Drawing Sheets

(56) References Cited

U.S. PATENT DOCUMENTS

2009/0315381 A1  12/2009  Longnecker
2015/0108814 A1   4/2015  Meister et al.

OTHER PUBLICATIONS

USPTO, Restriction Requirement dated Feb. 11, 2020 in U.S. Appl. No. 16/278,521.
USPTO, Non Final Office Action dated Apr. 15, 2020 in U.S. Appl. No. 16/278,521.
USPTO, Final Office Action dated Jul. 15, 2020 in U.S. Appl. No. 16/278,521.
USPTO, Notice of Allowance dated Sep. 29, 2020 in U.S. Appl. No. 16/278,521.

* cited by examiner

EASY HOOK ARMREST ASSEMBLY FOR AIRCRAFT SEAT

CROSS-REFERENCE TO RELATED APPLICATIONS

This application is a divisional of, claims priority to, U.S. application Ser. No. 16/278,521, filed Feb. 18, 2019 and titled "EASY HOOK ARMREST ASSEMBLY FOR AIRCRAFT SEAT," which is hereby incorporated by reference in its entirety.

FIELD

The present disclosure relates to aircraft seats, and, more specifically, to an easy hook assembly for an aircraft seat armrest.

BACKGROUND

Aircraft seats may include armrests for occupant comfort. The armrests are generally attached via a bracket. Shrouding and/or upholstery may surround, or be otherwise located on and around, the bracketing to increase the comfort and visual appeal of the armrest. Armrest installation generally consists of attaching the shrouds after the brackets have been attached to the seat. Attachment of the shrouds can damage the finished visual areas (e.g., the upholstery) due to the handling and tools used while installing the shrouds. Further, current armrest attachment methods do not allow for removal of the armrest for repair or maintenance with the shrouding attached. In other words, the shrouding may be removed to expose the components associated with detaching the armrest from seat. Such attaching and detaching of the shrouding can lead to damage and increases the time associated with seat installation and maintenance.

SUMMARY

An armrest for a seat is disclosed herein. In accordance with various embodiments, the armrest may comprise paneling and an easy hook assembly. The easy hook assembly may comprise a flange extending beyond an exterior surface of the paneling, and a keyhole protrusion extending beyond the exterior surface of the paneling.

In various embodiments, the easy hook assembly may further comprise a support bracket located between an inboard portion of the paneling and an outboard portion of the paneling. The inboard portion of the paneling may comprise the exterior surface.

In various embodiments, the easy hook assembly may further comprise an arm attached to the support bracket. The flange and the keyhole protrusion may extend from the arm. In various embodiments, the arm may comprise a U-shape.

In various embodiments, the easy hook assembly may further comprise a mounting bracket. The mounting bracket may define a keyhole opening configured to receive the keyhole protrusion. The mounting bracket may comprise a horizontal surface configured to support the flange.

In various embodiments, the flange may be generally orthogonal to the exterior surface of the paneling. In various embodiments, the paneling may be configured to translate relative to the flange.

A seat for an aircraft is also disclosed herein. In accordance with various embodiments, the seat may comprise a seat pan, a side panel located adjacent the seat pan, and an armrest coupled to the side panel. The armrest may include paneling and an easy hook assembly. The easy hook assembly may comprise a flange extending beyond an exterior surface of the paneling, and a keyhole protrusion extending beyond the exterior surface of the paneling.

In various embodiments, the keyhole protrusion may be located through a keyhole opening defined by the side panel. In various embodiments, the flange may be located on a horizontal surface of the side panel.

In various embodiments, the easy hook assembly may further comprise a support bracket located between an inboard portion of the paneling and an outboard portion of the paneling. The inboard portion of the paneling may comprise the exterior surface.

In various embodiments, the easy hook assembly may further comprise an arm attached to the support bracket. The flange and the keyhole protrusion may extend from the arm.

In various embodiments, the easy hook assembly may further include a mounting bracket coupled to the side panel. The mounting bracket may define a keyhole opening. The keyhole protrusion may be located through the keyhole opening. In various embodiments, the flange may be located on a surface of the mounting bracket.

In various embodiments, the paneling may be configured to translate relative to the side panel.

An easy hook assembly for an armrest of a seat is also disclosed herein. In accordance with various embodiments, the easy hook assembly may comprise a support bracket and an arm extending from the support bracket. The arm may include a flange defining a fastener orifice, and at least one of a first keyhole protrusion or a first keyhole opening.

In various embodiments, the arm may comprise a first strut attached to the support bracket, and a second strut generally parallel to the first strut. The second strut may include the at least one of the first keyhole protrusion or the first keyhole opening.

In various embodiments, the flange may be generally orthogonal to the second strut. In various embodiments, the flange may be configured to extend past an exterior panel surface of the armrest.

In various embodiments, the easy hook assembly may further comprising a mounting bracket. The mounting bracket may comprise a horizontal surface configured to support the flange, and at least one of a second keyhole protrusion or a second keyhole opening.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily repeated herein for the sake of clarity. As used herein, "distal" refers to a direction away from, or a location generally farther from a reference component. As used herein, "proximate" refers to a direction toward, or a location generally closer to a reference component.

Aircraft seats of the present disclosure may include armrests having easy hook assemblies. In various embodiments, the easy hook assemblies may include one or more horizontally extending flange(s) configured to support attachment of the armrest to a seat pan. The flanges may be exterior to and/or extend from decorative paneling of the armrest. In this regard, the easy hook assembly may allow the decorative paneling to be installed prior to attaching armrest to the seat pan. Additionally, the easy hook assembly may allow the armrest to be removed from the seat pan without removing the decorative paneling.

Figure 1:
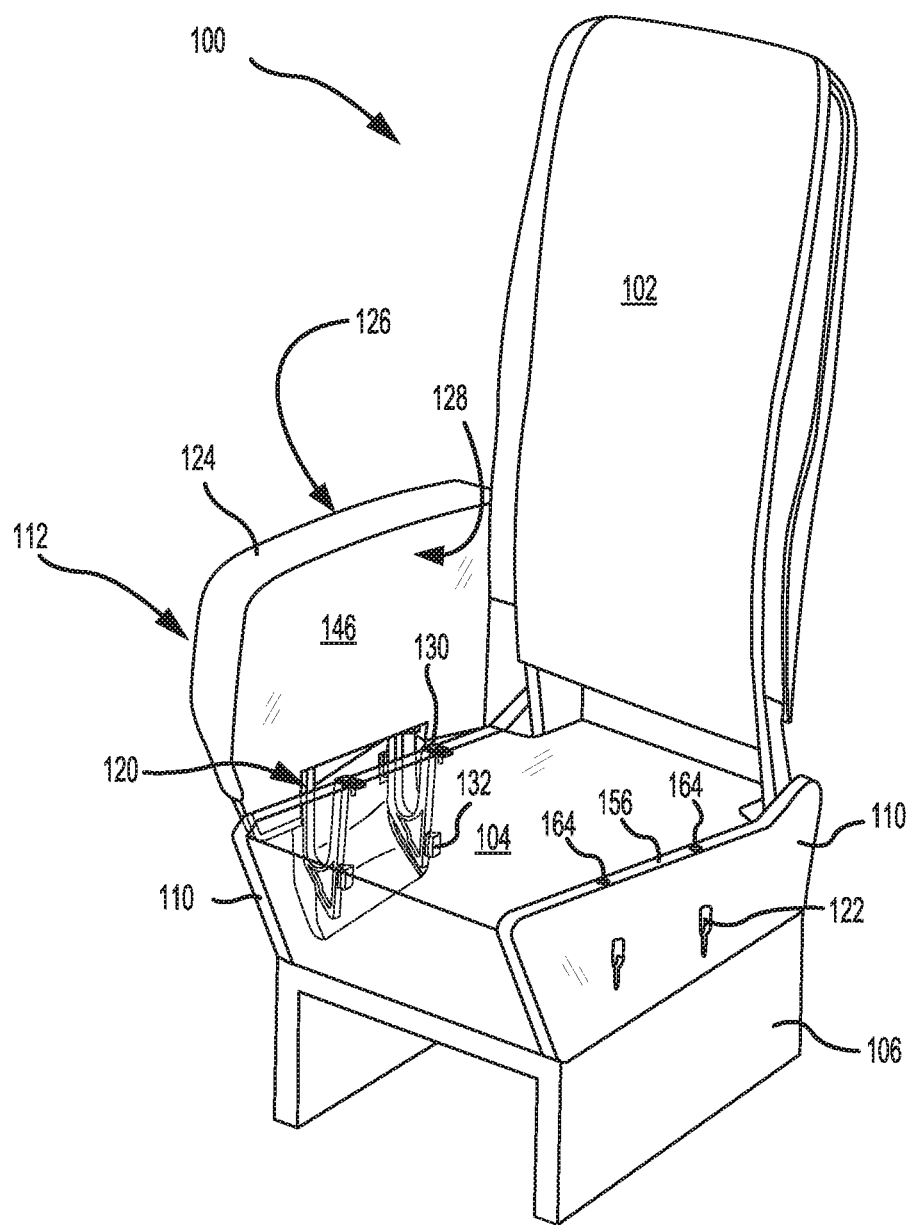
FIG. 1 illustrates a perspective view of an aircraft seat having armrests with easy hook assemblies, in accordance with various embodiments.

With reference to FIG. 1, a seat 100 is illustrated, in accordance with various embodiments. In various embodiment, seat 100 may be an aircraft seat. Seat 100 includes a seat back 102 and a seat pan 104. Seat pan 104 may be attached to a pedestal 106 configured to secure seat 100 to, for example, an aircraft floor. Seat 100 includes a pair of side panels 110 located on opposing sides of seat pan 104. Seat 100 further includes a set of armrests 112 (one shown) with one armrest 112 attached to each side panel 110. For clarity and to illustrate features of side panel 110 only one armrest 112 is shown in FIG. 1. Armrest 112 includes an easy hook assembly 120. Easy hook assembly 120 is configured to couple armrest 112 to side panel 110. Armrest 112 may include paneling 124. Paneling 124 may include shrouding and/or upholstery. For example, paneling 124 may be formed from plastic and/or fabric. Portions of paneling 124 may also include foam or other cushioning elements. Paneling 124 surrounds structural components of armrest 112 and easy hook assembly 120. Paneling 124 may increase the comfort and visual appeal of armrest 112. As described in further detail below, easy hook assembly 120 is configured to attach armrest 112 to side panel 110 with paneling 124 installed or otherwise attached to armrest 112. In this regard, components of easy hook assembly 120 (e.g., flanges 130 and/or keyhole protrusions 132) may be located outside paneling 124, such that armrest 112 can be attached to side panel 110 after installing paneling 124 and can be detached from side panel 110 without removing paneling 124.

Figure 2A:
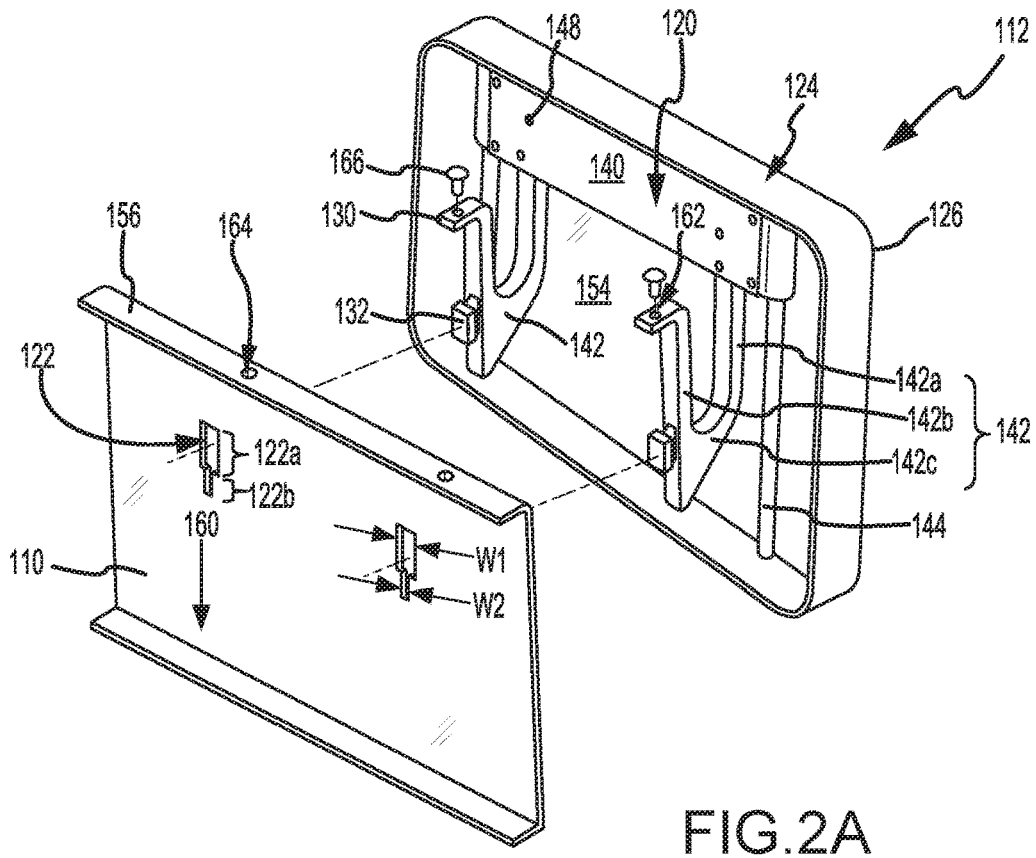
FIG. 2A illustrates an assembly view of an armrest easy hook assembly and a seat side panel, in accordance with various embodiments.
Figure 2B:
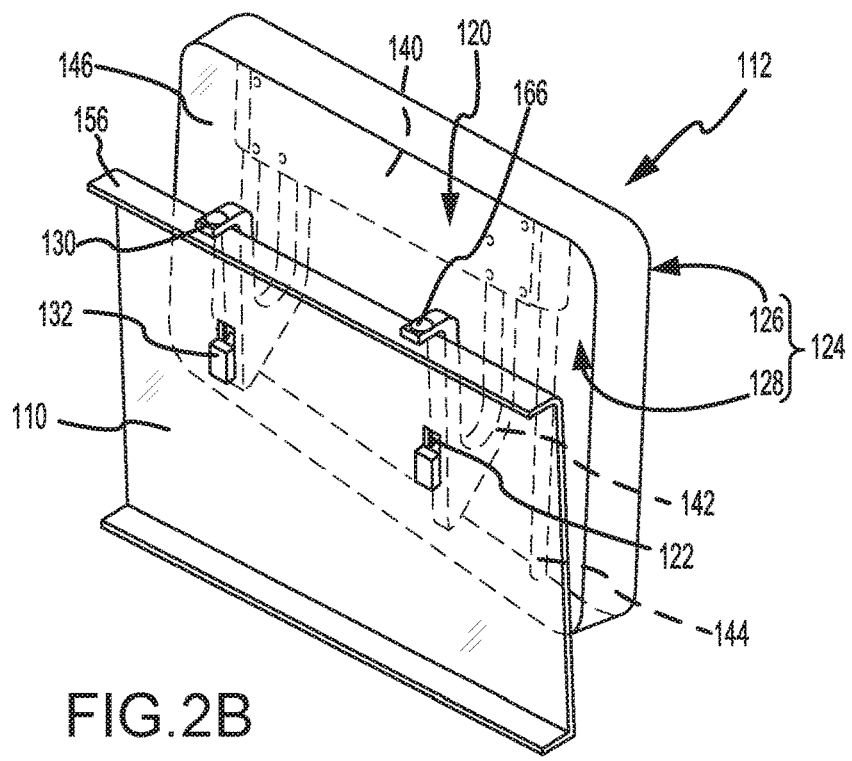
FIG. 2B illustrates an armrest attached to a seat side panel via an easy hook assembly, in accordance with various embodiments.

With reference to FIGS. 2A and 2B, additional details of the attachment of armrest 112 to side panel 110 are described, in accordance with various embodiments. Paneling 124 may include an outboard portion 126 (also referred to herein as outboard panel portion 126) and an inboard portion 128 (also referred to herein as inboard panel portion 128). Inboard panel portion 128 has been removed in FIG. 2A for clarity and to better illustrate features of easy hook assembly 120. Inboard panel portion 128 is located adjacent or proximate side panel 110. Outboard panel portion 126 is located opposite inboard panel portion 128. In this regard, outboard panel portion 126 is distal side panel 110.

Easy hook assembly 120 includes a support bracket 140 and one or more arm(s) 142. Support bracket 140 may be located between outboard panel portion 126 and inboard panel portion 128. Support bracket 140 may support paneling 124 and/or other armrest components (e.g., struts or posts 144) located between outboard panel portion 126 and inboard panel portion 128. In various embodiments, paneling 124 may be attached to support bracket 140.

Arms 142 of easy hook assembly 120 may be attached to support bracket 140. For example, arms 142 may be attached to support bracket 140 via arm fasteners 148. Arm fasteners 148 may include screws, rivets, clips, bolts and nuts, or any other suitable securement device. In various embodiments, arms 142 may be integrally formed with support bracket 140. As used herein, "integrally formed" may include forming one, single continuous piece. Arms 142 are configured to be secured to side panel 110. In various embodiments, arms 142 may each be generally U-shaped. In this regard, arms 142 may each include a first strut 142a, a second strut 142b, and a connecting strut 142c. First and second struts 142a, 142b may be generally parallel to one another. As used in the previous context, "generally parallel" means±15° from parallel. First strut 142a may be attached to support bracket 140. First strut 142a may be located proximate an internal surface 154 of outboard panel portion 126. Internal surface 154 is oriented toward inboard panel portion 128 and side panel 110. Connecting strut 142c may extend between first strut 142a and second strut 142b. Second strut 142b may be located proximate inboard panel portion 128.

In various embodiments, arms 142 may each include a flange 130 and one or more keyhole protrusion(s) 132. Flanges 130 may extend horizontally from arms 142. Stated differently, flange 130 may extend away from second strut 142b and toward side panel 110. Flange 130 may be generally orthogonal to an exterior surface 146 of inboard panel portion 128 and/or generally orthogonal to second strut 142b. As used in the previous context, "generally orthogonal" means±15° from orthogonal. Exterior surface 146 of inboard panel portion 128 is oriented away from outboard panel portion 126 and toward side panel 110. The angle of flange 130 relative to second strut 142b is selected such that flange 130 will be parallel to a horizontal surface 156 of side panel 110. Horizontal surface 156 is generally orthogonal to exterior surface 146 of inboard panel portion 128. As used in the previous context, "generally orthogonal" means±15° from orthogonal. When seat 100 (FIG. 1) is installed, horizontal surface 156 is generally parallel to the floor or surface supporting seat 100. As used in the previous context, "generally parallel" means±15° from parallel. Horizontal surface 156 and flange 130 are configured such that they are accessible when paneling 124 is attached to armrest 112.

In various embodiments, flanges 130 may each define a fastener orifice 162. Fastener orifices 162 are configured to align with panel orifices 164 defined by horizontal surface 156 of side panel 110. Fasteners 166 may be located through fastener orifices 162 and panel orifices 164. Fasteners 166 may secure flange 130 to side panel 110. Fasteners 166 may include screws, rivets, pins, clips, bolts and nuts, or any other suitable securement device. A length of flange 130 and a location of fastener orifice 162 are selected such that fastener orifice 162 is located outside, or exterior to, paneling 124. Stated differently, flange 130 is configured to extend past exterior surface 146 of inboard panel portion 128, and fastener orifice 162 is located in the portion of flange 130 that is exterior to paneling 124.

In various embodiments, arms 142 may include one or more keyhole protrusion(s) 132. Keyhole protrusion 132 may extend from second strut 142b toward side panel 110. Side panel 110 may include keyhole openings 122 configured to receive keyhole protrusions 132. In various embodiments, keyhole openings 122 may be formed through side panel 110. Stated differently, side panel 110 may define keyhole openings 122. Keyhole openings 122 each include a first portion 122a comprising a width W1 and a second, narrower portion 122b comprising a width W2. Width W2 is less than width W1. Keyhole openings 122 and keyhole protrusions 132 are configured such that keyhole protrusions 132 may be inserted in first portion 122a and then translated in the direction of arrow 160 into second portion 122b. Keyhole openings 122 and keyhole protrusions 132 are configured such that locating keyhole protrusions 132 in second portion 122b of keyhole openings 122 reduces or prevents horizontal translation of armrest 112 (i.e., translation away from side panel 110). Thus, vertical movement of arms 142 may be reduced or prevented by securing fasteners 166 to flange 130 and horizontal surface 156, and horizontal movement of arms 142 may be reduced or prevented by locating keyhole protrusions 132 in second portion 122b of keyhole openings 122.

While FIGS. 2A and 2B show keyhole protrusions 132 extending from second strut 142b with keyhole opening 122 formed through side panel 110, it is further contemplated and understood that in various embodiments, second strut 142b may define one or more keyhole opening(s), similar to keyhole openings 122, and side panel 110 may include one or more a keyhole protrusion(s), similar to keyhole protrusions 132. Second strut 142b and side panel 110 may each also include a combination of keyhole protrusions and keyhole openings.

Side panel 110 and arms 142 are configured such that, when keyhole protrusions 132 are located within second portion 122b of keyhole openings 122, flange 130 will be located on or in close proximity to horizontal surface 156 of side panel 110. Flange 130 and keyhole protrusions 132 are configured to extend beyond exterior surface 146 of inboard panel portion 128. In this regard, keyhole protrusions 132 may be located through keyhole openings 122 and fasteners 166 may be located through flanges 130 when paneling 124 is attached to armrest 112. For example, paneling 124 may be attached to armrest 112 prior to securing armrest 112 to side panel 110. Armrest 112 may also be removed from side panel 110 without removing paneling 124.

Figure 3A:
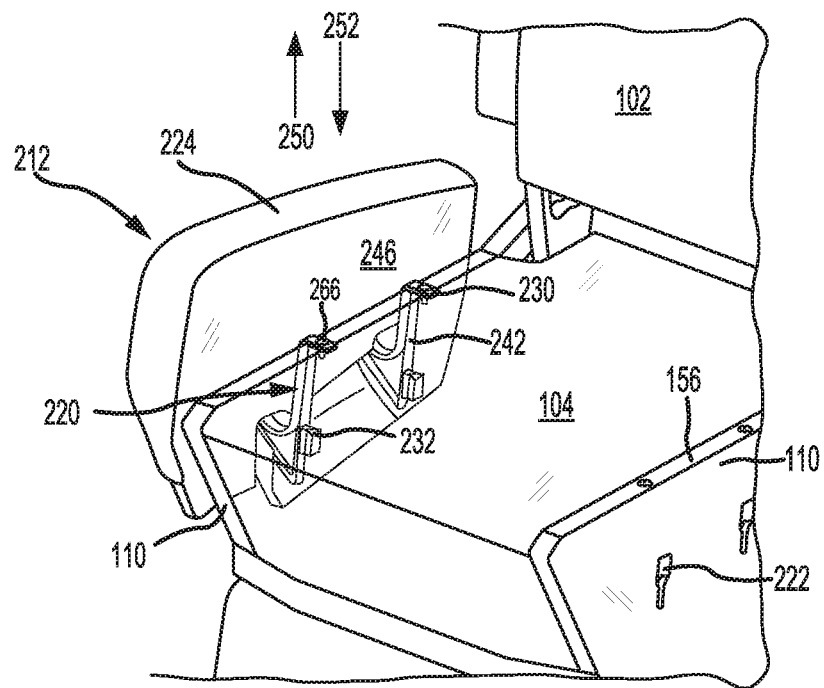
FIGS. 3A and 3B illustrate an armrest having an easy hook assembly and adjustable paneling, in accordance with various embodiments.
Figure 3B:
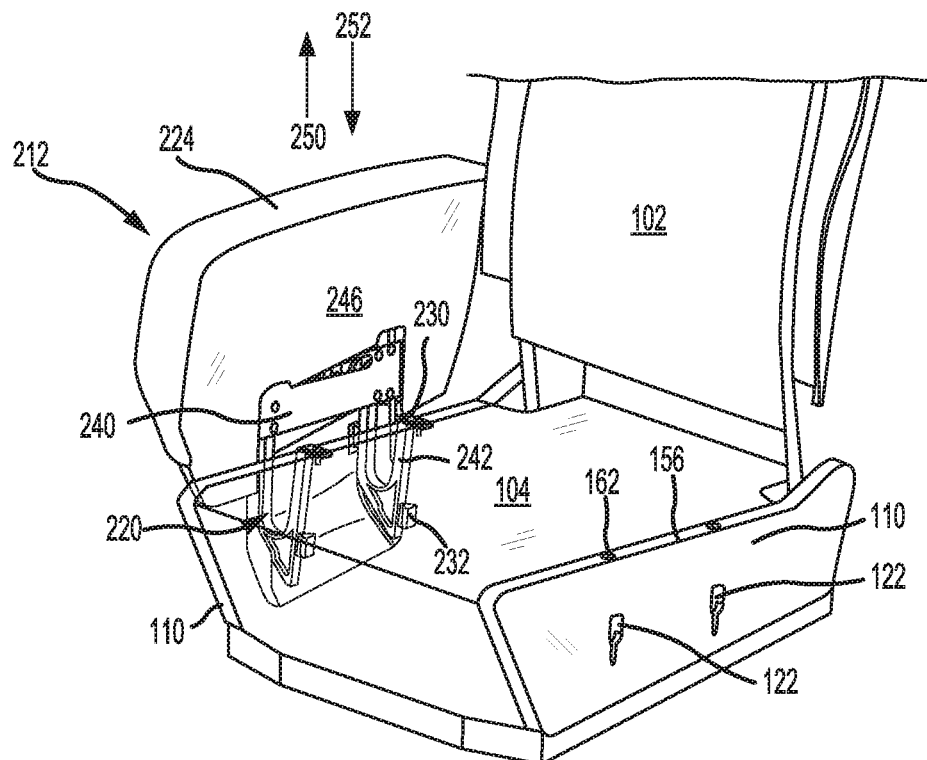

Referring to FIGS. 3A and 3B, an extendable armrest 212 having an easy hook assembly 220 is illustrated, in accordance with various embodiments. In various embodiments, seat 100 may include extendable armrest 212 in place of armrest 112. Easy hook assembly 220 includes a support bracket 240 and arms 242.

Armrest 212 includes paneling 224. Paneling 224 may be configured to translate relative to arms 242 of easy hook assembly 220. For example, paneling 224 may be translated in the direction of arrows 250 and 252. Armrest 212 may include posts, similar to posts 144 in FIG. 2A. Paneling 224 may be attached to the posts. The posts may slide relative to support bracket 240, thereby translating paneling 224 in the direction of arrows 250 and 252.

Arms 242 may be fixed to side panel 110. In this regard, arms 242 may remain stationary, while paneling 224 is translated in the direction of arrows 250 and 252. Arms 242 may each include a flange 230 and one or more keyhole protrusions 232, similar to flanges 130 and keyhole protrusions 132 of easy hook assembly 120 in FIG. 2A. Fasteners 266 may secure flanges 230 to horizontal surface 156 of side panel 110. Flanges 230 extend beyond an exterior surface 246 of paneling 224. In this regard, keyhole protrusions 232 may be located through keyhole openings 122 and fasteners 266 may secure flanges 230 to side panel 110 with paneling 224 attached to armrest 212. Paneling 224 may thus be attached to armrest 212 prior to securing armrest 212 to side panel 110. Armrest 212 may also be removed from side panel 110 without removing paneling 224.

Figure 4:
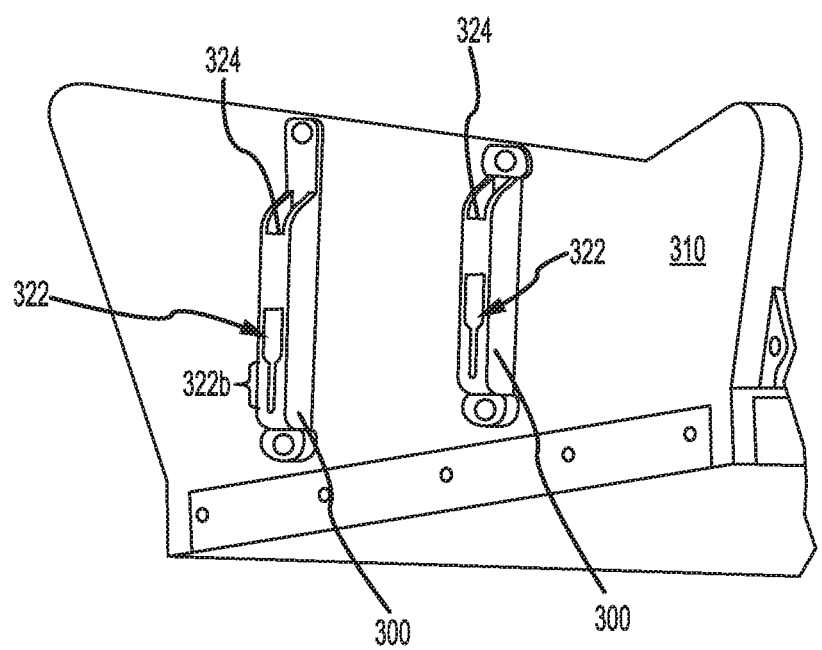
FIG. 4 illustrates mounting brackets of an easy hook assembly attached to a side panel of a seat, in accordance with various embodiments.

FIG. 4 illustrates mounting brackets 300 for attaching an armrest having an easy hook assembly to a side panel that is not designed for easy hook assembly attachment. In various embodiments, easy hook assembly 120 of FIG. 1 and/or easy hook assembly 220 of FIG. 3A may include mounting brackets 300 for attaching arms 142, 242 to side panel 310. Mounting brackets 300 are attached to side panel 310. Side panel 310 may be devoid of keyhole openings and/or may be not include a surface suitable for supporting flanges 130, 230 of easy hook assemblies 120, 220. Mounting brackets 300 may thus allow armrests that include an easy hook assembly (e.g., armrest 112 in FIG. 2A or armrest 212 in FIG. 3A) to be retrofit onto side panels which were not originally designed to support attachment of an easy hook assembly.

Mounting brackets 300 may each define a keyhole opening 322, similar to keyhole opening 122 in FIG. 2A. Mounting brackets 300 further include a horizontal surface 324 configured to support flanges 130, 230 and receive fasteners 166, 266. A distance between horizontal surface 324 and keyhole opening 322 is selected such that, when the keyhole protrusion (e.g., keyhole protrusion 132 in FIG. 2A or keyhole protrusion 232 in FIG. 3A) is located in narrow portion 322b of keyhole opening 322, the easy hook flange (e.g., flange 130 in FIG. 2A or flange 230 in FIG. 3A) will be located on, or in close proximity to, horizontal surface 324 of mounting bracket 300. Mounting brackets 300 may thus allow armrests having easy hook assemblies to be coupled to side panel 310 with paneling attached to the armrest.

While FIG. 4 shows keyhole openings 322 defined by mounting bracket 300, it is further contemplated and understood that, in various embodiments, mounting bracket 300 may include one or more keyhole protrusion(s) and the easy hook assembly arms (e.g., arms 142 in FIG. 2A or arms 242 in FIG. 3A) may define the keyhole opening(s).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hook assembly for an armrest of a seat, comprising:
   a support bracket; and
   an arm extending from the support bracket, the arm including:
   a first strut coupled to the support bracket;
   a second strut generally parallel to the first strut;
   a connecting strut extending between the first strut and the second strut, wherein the first strut, the second strut, and the connecting strut are configured in a U-shape;
   a flange located at a top end of the second strut and extending from a first surface of the second strut, the top end of the second strut being located opposite the connecting strut, wherein a portion of the flange is configured to extend beyond an exterior surface of a paneling, wherein the flange defines a fastener orifice, and wherein the fastener orifice is formed through a first horizontal surface of the flange and a second horizontal surface of the flange, the second horizontal surface being opposite the first horizontal surface, wherein the first horizontal surface and the second horizontal surface are each generally orthogonal to the first surface of the second strut, and wherein the second horizontal surface is configured to interface with a horizontal surface on top of a side panel of the seat; and
   a first keyhole protrusion extending from the second strut, wherein the first keyhole protrusion is located between the top end of the second strut and a bottom end of the connecting strut, the bottom end of the connecting strut being located opposite the second strut, wherein the keyhole protrusion is configured to extend beyond the exterior surface of the paneling, wherein the second horizontal surface of the flange is oriented toward the keyhole protrusion.

2. The hook assembly of claim 1, wherein the flange is configured to extend past an exterior panel surface of the armrest.

3. The hook assembly of claim 1, further comprising a mounting bracket, wherein the arm includes the first keyhole opening, and wherein the mounting bracket comprises:
   a horizontal surface configured to support the flange.

4. The hook assembly of claim 3, further comprising a fastener located through the fastener orifice in the flange and the horizontal surface of the mounting bracket.

5. The hook assembly of claim 1, further comprising a mounting bracket, wherein the arm includes the first keyhole protrusion, and wherein the mounting bracket comprises:
   a horizontal surface configured to support the flange.

6. The hook assembly of claim 5, further comprising a fastener located through the fastener orifice in the flange and the horizontal surface of the mounting bracket.

7. The hook assembly of claim 1, further comprising a fastener located through the fastener orifice in the flange.

8. The hook assembly of claim 1, wherein the arm includes the first keyhole protrusion, and wherein the first keyhole protrusion extends from the first surface of the second strut in a direction away from the first strut.

9. The hook assembly of claim 8, wherein the second horizontal surface of the flange is generally parallel to the first horizontal surface of the flange, and wherein the second horizontal surface is oriented toward the first keyhole protrusion.

* * * * *